UNITED STATES PATENT OFFICE.

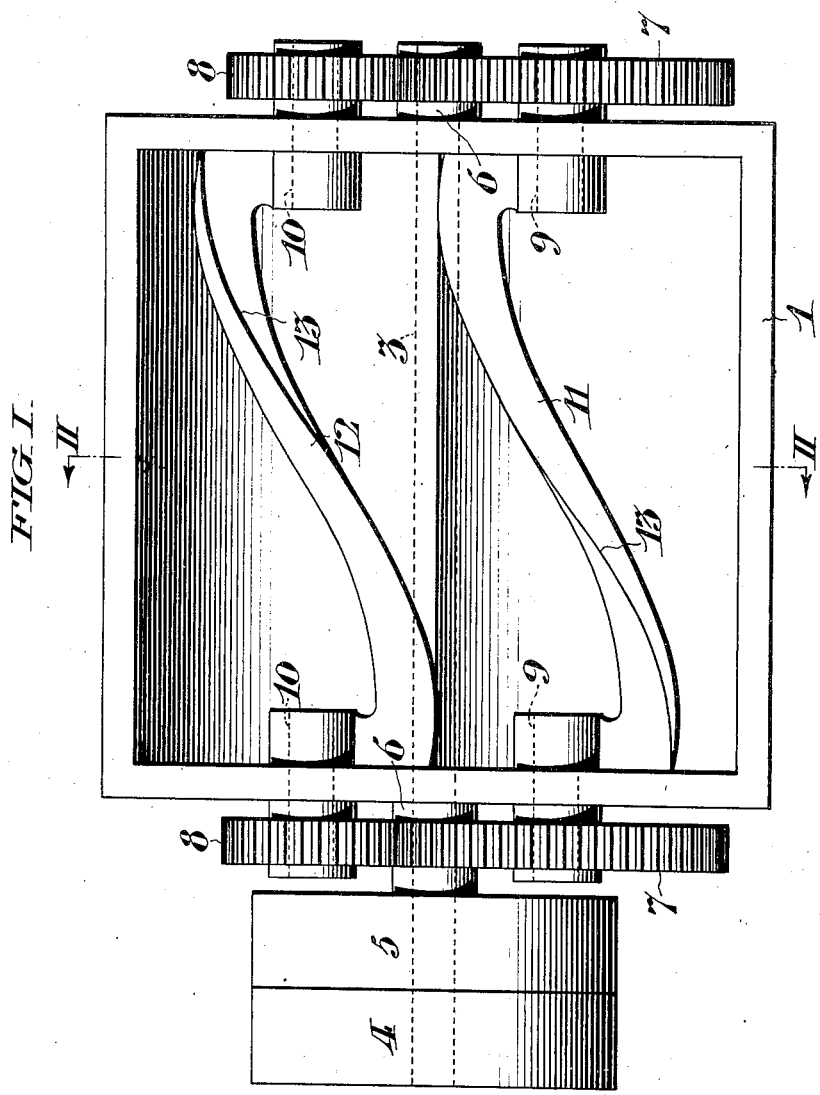

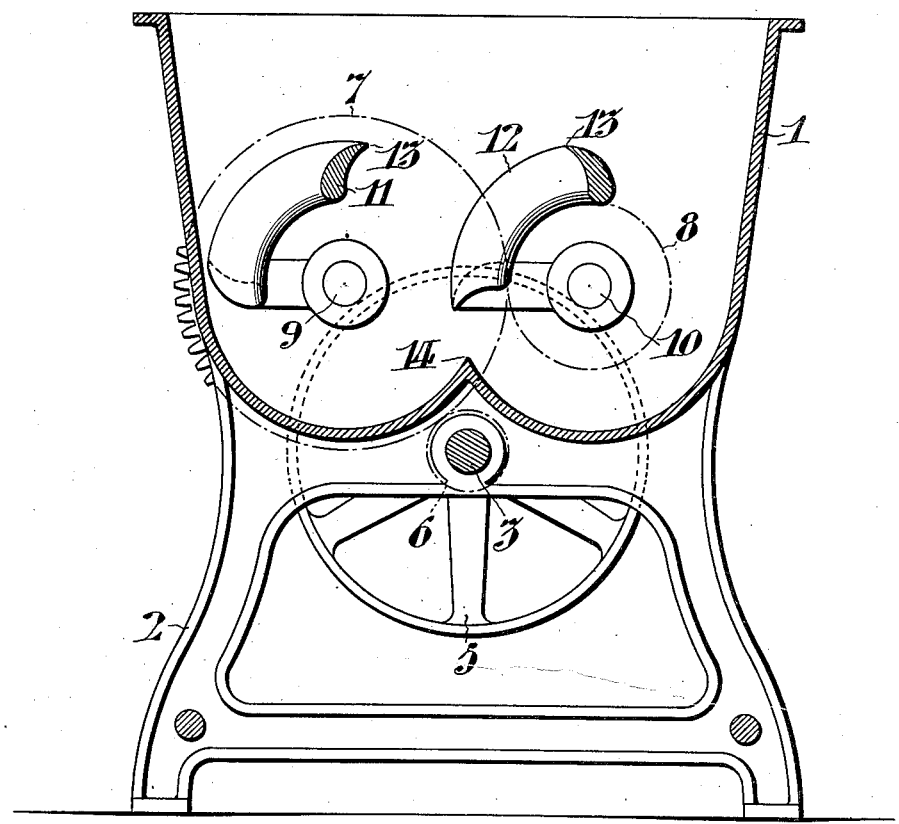

JAMES D. DARLING, OF PHILADELPHIA, PENNSYLVANIA.

CHEWING-GUM.

No. 907,748.  Specification of Letters Patent.  Patented Dec. 29, 1908.

Application filed December 31, 1907. Serial No. 408,721.

*To all whom it may concern:*

Be it known that I, JAMES D. DARLING, of Philadelphia, in the county of Philadelphia and State of Pennsylvania, have invented certain new and useful Improvements in Chewing-Gum, whereof the following is a specification, reference being had to the accompanying drawings.

Hitherto chewing gum has been manufactured from certain resinous gums, notably from spruce gum or from gum chicle. These substances possess by nature the required consistency and especially the high degree of ductility and plasticity with absence of resiliency, which is necessary for a masticatory gum.

I have discovered that a substance having similar qualities to the above and suitable for the same purposes, may be manufactured from certain low grade rubbers. Ordinarily rubber or caoutchouc in all its forms is unsuited for mastication, because of its toughness and high resiliency. It also usually has a disagreeable taste and odor. Low grade rubbers are characterized by the presence of a high percentage of resin, but by reason of the rubber which they contain cannot ordinarily be used in the manufacture of chewing gum. I have found that by the process which I will describe, it is possible to convert such a low grade rubber into a superior masticatory gum. To accomplish this, it is necessary to cleanse and purify the crude product, whenever, as is usually the case, it is accompanied by impurities which give it a disagreeable taste or odor. It is also necessary to render the rubber content less tough and resilient. In this way I am able to produce from cheap, low grade rubber the entirely satisfactory masticatory gum which I have invented, having the peculiar cohesiveness, plasticity and ductility which is required, not adhesive to the teeth, not tough and not resilient and also odorless and tasteless.

In the present specification the word "resiliency", is used to denote that quality, highly characteristic of india rubber, by which it completely restores or reforms itself after distortion by a given strain, as soon as the strain is removed. It is opposed to plasticity, by which is meant the capacity to receive and maintain new forms. Chewing gum must be plastic and non-resilient.

The rubber which I have found most suitable for conversion into my new product is known in the trade as "pontianak", an india rubber procured from Borneo, and sometimes known as "gutta-jelutong", and under these names largely imported into this country. Analysis of commercial pontianak shows that exclusive of water, it usually contains about 75% of resin, something over 24% of rubber, and a fraction of 1% of ash. Authorities however, state that at times the resin content may reach 90%. This material as imported into this country, is entirely unsuitable for use as a chewing gum, not only because of the impurities which it contains, but because the rubber content renders it too tough and too resilient. But by subjecting this material to the process of treatment which I will describe, I am able to produce an exceedingly desirable chewing gum at a low price.

I take the crude pontianak of commerce, and after cleaning it, cut or chip it up into small pieces, preferably by a mechanical cutter. This comminuted material is then placed in a suitable receptacle and there boiled for a considerable time in an alkaline solution. For this purpose the use of twenty-five pounds of caustic soda to one hundred gallons of water will produce the proper result. The boiling is continued until all the impurities present in the crude article have sunk to the bottom, while the mixture of rubber and resin, purified and considerably changed in its physical characteristics, floats at or near the surface as a spongy mass. When freed from the alkaline liquor this mass is odorless and tasteless, but still somewhat tough and resilient. This product is removed and after repeated washings is subjected to a "pulling" or kneading operation, by which its physical qualities are further changed. For this purpose I prefer to use the apparatus shown in the accompanying drawings, in which—

Figure I, is a plan view of an apparatus which can be conveniently employed to carry out my process, and Fig. II, is a cross section of the same, taken on the lines II, II, in Fig. I.

In the drawings, 1, is a hopper mounted on standards 2. A shaft 3, is conveniently journaled in said standards 2, and carries the tight and loose pulleys 4, and 5, and also the pinions 6, 6, which are keyed thereto adjacent to each end of the hopper 1. Pinions 6, 6, transmit motion to the gears 7, 7, which in turn mesh with the gears 8, 8. Gears 7, 7, and 8, 8, are fast upon trunnions 9, 9, and 10, 10, to which are fastened the revolving blades 11, and 12, respectively. Said blades 11, and 12, are spiral in form and their sharp edges 13, are adapted to shear against the edge 14, on the bottom of hopper 1, as can be clearly seen in Fig. II. The blade 12, revolves in an opposite direction to and twice as fast as the blade 11, by virtue of the relation of the gears 7, 7, to the gears 8, 8, thus thoroughly mixing by a combined shearing and tearing action.

It will be understood that the machine above described forms no part of my invention but is well adapted to perform the pulling, cutting and kneading, by means of which I secure my product. During the treatment of the material in this apparatus it is maintained at a temperature of between 200° and 300° Fahrenheit.

The treatment is continued for a considerable time, determined by observation, and as a result the physical characteristics of the rubber are markedly changed. The rubber content of the mass will be found to have lost its toughness and resiliency and the mass will have become plastic, tenacious and extremely ductile, so that it may be pulled out in fine threads of almost indefinite length with little or no resiliency, and these qualities are retained by it for a long time. This product is eminently suited for use in the manufacture of chewing gum. I find that under some circumstances, the substance is improved by the addition thereto of about five per cent. of a pure vegetable wax or some other similar waxy substance. This may be introduced in the mixer and aids in giving the product precisely the required consistency. If desired, suitable flavoring or coloring extracts may be added in the course of the same operation.

The resulting product is a new article of manufacture, possessing physical characteristics and composition differing from other known substances. To those skilled in such tests it will be observable that the combined plasticity, cohesiveness and ductility at natural temperatures of this product are markedly distinct from other known substances or products. It may be further identified by the fact that notwithstanding its physical change, the relative proportions of the rubber and resin content remain as they are found in the crude rubber, namely, about three times as much resin as rubber. Also upon heating to the melting point, a characteristic rubbery smell will be observed. Upon analysis it yields about two and one-half per cent. of matter insoluble in hot benzin.

In the present application I do not claim the new process of manufacturing chewing gum, which I have above described, the same being reserved for my co-pending application, Serial No. 441,517 filed July 2, 1908, as a divisional of the present case, in which I claim only my new product.

Having thus described my invention, I claim:

1. As a new article of manufacture, a non-resilient and plastic chewing gum, containing resin and rubber in approximately the proportions of three parts resin to one of rubber.

2. As a new article of manufacture a chewing gum consisting of low grade rubber containing about 75% of resin, the mass being plastic, intensely ductile, tasteless and odorless at ordinary temperatures but yielding a characteristic rubbery odor when heated to the melting point.

3. As a new article of manufacture, a tasteless, odorless, tenacious, cohesive, plastic, intensely ductile, non-resilient, resinous substance, composed of low grade rubber cleansed and rendered plastic, and having a resinous and a rubber content in the proportions in which they occur in said low grade rubber.

4. As a new article of manufacture a tasteless, odorless, intensely ductile and non-resilient chewing gum, composed of pontianak rubber cleansed and rendered plastic, and having a resinous and a rubber content in the proportions in which they occur in pontianak rubber.

In testimony whereof, I have hereunto signed my name, at Philadelphia, Pennsylvania, this twenty-eighth day of December 1907.

JAMES D. DARLING.

Witnesses:
JAMES H. BELL,
E. L. FULLERTON.